United States Patent [19]

Nakanishi et al.

[11] Patent Number: 5,744,575

[45] Date of Patent: Apr. 28, 1998

[54] AROMATIC POLYIMIDE AND GAS SEPARATION

[75] Inventors: Shunsuke Nakanishi; Kenji Ito; Yoshihiro Kusuki, all of Chiba, Japan

[73] Assignee: Ube Industries, Ltd., Yamaguchi, Japan

[21] Appl. No.: 659,330

[22] Filed: Jun. 6, 1996

[30] Foreign Application Priority Data

Jun. 6, 1995 [JP] Japan ................ 7-139279
Jun. 6, 1995 [JP] Japan ................ 7-139280
Jun. 6, 1995 [JP] Japan ................ 7-139281

[51] Int. Cl.$^6$ ................................. C08G 73/10
[52] U.S. Cl. ................ 528/353; 528/125; 528/128; 528/171; 528/172; 528/173; 528/174; 528/179; 528/180; 528/182; 528/183; 528/188; 528/220; 528/226; 528/229; 528/350; 428/357; 428/364; 428/396; 428/411.1; 428/473.5; 55/16; 55/158
[58] Field of Search ................ 528/226, 353, 528/220, 229, 174, 172, 171, 173, 175, 179, 180, 350, 182, 183, 125, 188, 128; 428/411.1, 473.5, 396, 357, 364; 55/16, 66, 158

[56] References Cited

U.S. PATENT DOCUMENTS 5,145,940  9/1992  Wernet et al. .................... 528/226
5,198,316  3/1993  Wernet et al. .................... 430/32

*Primary Examiner*—P. Hampton-Hightower
*Attorney, Agent, or Firm*—McAulay Fisher Nissen Goldberg & Kiel, LLP

[57] ABSTRACT

An aromatic polyimide having a recurring unit of the formula (I):

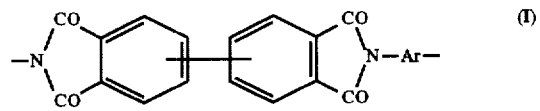

(I)

wherein Ar is a divalent aromatic group having one or two benzene rings which has a sulfonate group of —SO$_3$H, —SO$_3$M, and —SO$_3$N(L)$_4$ on the ring, wherein M is an alkali metal and L is a hydrogen atom or an alkyl group having 1 to 5 carbon atoms, is favorably employed in the form of a semipermeable film for gas separation.

17 Claims, No Drawings

AROMATIC POLYIMIDE AND GAS SEPARATION

FIELD OF THE INVENTION

The present invention relates to an aromatic polyimide, a semipermeable film of aromatic polyimide, and a gas separation method utilizing a semipermeable film.

BACKGROUND OF THE INVENTION

An aromatic polyimide has been widely employed in various industrial fields, for instance, in the form of film, sheet, molded article, semipermeable hollow fiber, or varnish. For instance, an aromatic polyimide is employed as material for electronic devices, electro-insulating materials, material for gas separating devices, and material for medical devices.

A representative aromatic polyimide is produced by polycondensation between an aromatic tetracarboxylic dianhydride such as pyromellitic dianhydride or biphenyl tetracarboxylic dianhydride and an aromatic diamine such as diaminodiphenyl ether in equimolar amounts in an organic solvent to give a polyamide acid, and imidization of the polyamide acid by heating, or processing in an acid anhydride such as acetic anhydride.

Japanese Patent Provisional Publication 63-283704 discloses an aromatic polyimide film for separation or concentration of an aqueous organic solution. The aromatic polyimide has a sulfonate group on its aromatic ring. As the polyimide, a reaction product between pyromellitic anhydride and an aromatic diamine having a sulfonate group on its aromatic ring is mentioned.

Japanese Patent Provisional Publication 63-283707 discloses an amphoteric polymer film having an aromatic skeleton chain and both an anionic group and a cationic group on the skeleton chain. As the polymers to be made amphoteric, polyamide, polyamideimde, polyimide, polyurea, polyurethane, polysulfone, and polyether are mentioned. As the tetracarboxylic acid anhydride for the preparation of the polyimide, trimellitic anhydride or pyromellitic anhydride is used. The amphoteric polymer film is proposed for the use for separation or concentration of an aqueous organic solution.

Japanese Patent Provisional Publication 58-153541 discloses an ion exchange resin of sulfonated polyimide which is produced by reaction between 1,2,3,-butanetetracarboxylic acid and a diamine compound having a sulfonate group.

Japanese Patent Provisional Publication H3-137928 discloses a gas separation film which is composed of a porous aromatic polyimide or polyamideimide layer and a selective layer of poly-2,6-dimethyl-1,4-phenylene oxide or the like. The polyimide is produced by reaction between pyromellitic anhydride and diaminodiphenyl ether.

Japanese Patent Provisional Publication H5-192552 describes a polyimide gas separation film. The polyimide is produced by tetracarboxylic dianhydride and a diamine component having a bisphenylfluorein skeleton which has a carboxylate group or a sulfonate group on its benzene ring.

Japanese Patent Provisional Publication H6-87957 (corresponding to U.S. Pat. Nos. 5,145,940 and 5,198,316, and EP-B-471 650) describes a copolyimide which is produced by reaction between a carboxylic acid component mixture comprising an aromatic tetracarboxylic acid component and an aromatic tricarboxylic acid component and an aromatic diamine. The aromatic diamine has a sulfonate group on its aromatic ring. The copolyimide is employable for producing a relief image. The copolyimide can be made in the form of a semipermeable film for separation or concentration of an organic carboxylic acid salt from other compounds.

The present inventors have studied the sulfonate group-containing aromatic polyimide or copolyimide of prior art and noted that these polymers are not easily produced or do not show satisfactory mechanical strength.

SUMMARY OF THE INVENTION

It is a main object to provide a new aromatic polyimide which is favorably employable for the preparation of a semipermeable film.

It is another object to provide a new semipermeable aromatic polyimide film.

It is a further object to provide a new semipermeable hollow fiber favorably employable for gas separation.

There is provided by the present invention an aromatic polyimide having a recurring structural unit of the formula (I):

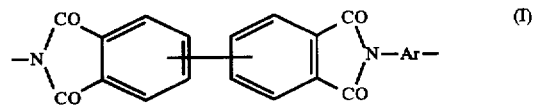

wherein Ar is a divalent aromatic group having the formula (II):

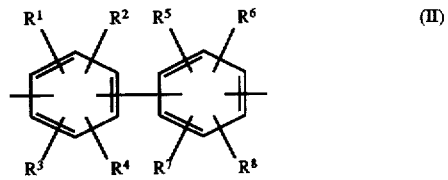

in which at least one of $R^1$ through $R^4$ is a sulfonate group selected from the group consisting of —$SO_3H$, —$SO_3M$, and —$SO_3N(L)_4$, wherein M is an alkali metal and L is a hydrogen atom or an alkyl group having 1 to 5 carbon atoms (e.g., methyl, ethyl, propyl, isopropyl, butyl, isobutyl, or amyl), and others of $R^1$ through $R^4$ are independently hydrogen atoms or alkyl groups having 1 to 3 carbon atoms (e.g., methyl, ethyl, propyl, or isopropyl); or the formula (III):

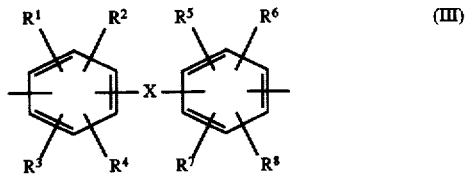

in which at least one of $R^1$ through $R^8$ is a sulfonate group selected from the group consisting of —$SO_3H$, —$SO_3M$, and —$SO_3N(L)_4$, wherein M is an alkali metal and L is a hydrogen atom or an alkyl group having 1 to 5 carbon atoms, and others of $R^2$ through $R^1$ are independently hydrogen atoms or alkyl groups having 1 to 3 carbon atoms, and X is a single bond (i.e., C—C), —O—, —$SO_2$—, —NH—, an alkylene group having 1 to 3 carbon atoms, or an alkenylene group having 1 to 3 carbon atoms.

There is further provided by the invention a semipermeable film of an aromatic polyimide having a recurring structural unit of the above-mentioned formula (I).

It has been found that the sulfonate group-containing aromatic polyimide of the invention is easily produced and shows a high mechanical strength. It has been further found that the sulfonate group-containing aromatic polyimide of the invention is satisfactorily employed in the form of a semipermeable film such as a semipermeable hollow fiber for gas separation, because it shows a high mechanical strength and further a high selectivity in gas separation procedures, for instance, gas separation between oxygen and nitrogen, or helium and nitrogen, and gas separation of hydrogen or carbon dioxide from a gaseous mixture.

DETAILED DESCRIPTION OF THE INVENTION

The preferred embodiments of the present invention are described below:

1) The above-mentioned aromatic polyimide, wherein Ar has the formula (II) having the sulfonate group represented by —$SO_2N(L)_4$ in which each of L is a hydrogen atom or an alkyl group having 1 to 5 carbon atoms.
2) The aromatic polyimide, wherein Ar has the formula (II) having the sulfonate group represented by —$SO_3H$.
3) The aromatic polyimide, wherein Ar has the formula (II) having the sulfonate group represented by —$SO_3M$ in which M is Li, Na or K.
4) The aromatic polyimide, wherein Ar has the formula (III) having the sulfonate group represented by —$SO_3N(L)_4$ in which each of L is a hydrogen atom or an alkyl group having 1 to 5 carbon atoms, and X is a single bond (i.e., C—C bond).
5) The aromatic polyimide, wherein Ar has the formula (III) having the sulfonate group represented by —$SO_3H$, and X is a single bond.
6) The aromatic polyimide, wherein Ar has the formula (III) having the sulfonate group represented by —$SO_2M$ in which M is Li, Na or K, and X is a single bond.

The aromatic polyimide of the invention which has the sulfonate group of —$SO_3N(L)_4$ on the aromatic ring can be prepared by a process which comprises reacting a biphenyltetracarboxylic acid or its derivative (e.g., its dianhydride) with an aromatic diamine compound having the a sulfonate group which is represented by the formula (IV) or (V):

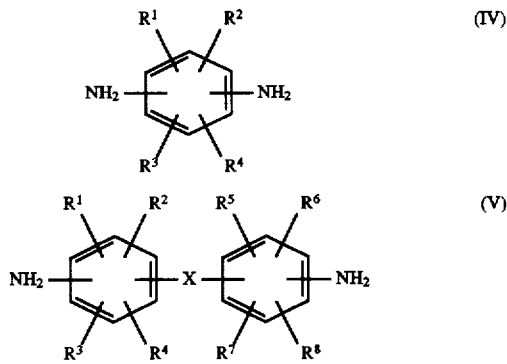

in which $R^1$ to $R^8$ and X have the same meaning as hereinbefore, in essentially equimolar amounts in a phenolic solvent.

The resulting aromatic polyimide having a recurring structural unit of the formula (I):

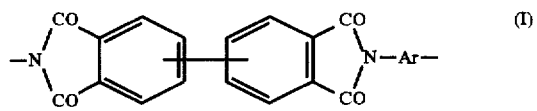

wherein Ar has the same meaning as above, except that at least one of $R^1$ to $R^4$ is a sulfonate group of —$SO_3N(L)_4$ wherein L is a hydrogen atom or an alkyl group having 1 to 5 carbon atoms, can be brought into contact with an acid or an alkoxide or hydroxide of an alkali metal to convert the sulfonate group of —$SO_3N(L)_4$ into the sulfonate group of —$SO_3H$ or —$SO_3M$ in which M has the same meaning as above.

It is almost impossible to produce the aromatic polyimide having the —$SO_3H$ or —$SO_3M$ group on its benzene ring directly by the reaction between a biphenyltetracarboxylic acid or its derivative and an aromatic diamine having —$SO_3H$ or —$SO_3M$ group on its benzene ring.

Examples of the biphenyltetracarboxylic acid or its derivative include 3,3',4,4'-biphenyltetracarboxylic acid, its dianhydride and its esters, and 2,3,3',4'-biphenyltetracarboxylic acid, its dianhydride and its esters.

Examples of the aromatic diamine having a sulfonate group which is represented by the formula (IV) or (V) include the following:

ammonium 2,5-diaminobenzensulfonate,
trimethylammonium 2,5-diaminobenzenesulfonate,
triethylammonium 2,5-diaminobenzensulfonate,
tributylammonium 2,5-diaminobenzensulfonate,
triamylammonium 2,5-diaminobenzensulfonate,
ammonium 2,4-diaminobenzensulfonate,
trimethylanmonium 2,4-diaminobenzenesulfonate,
triethylammonium 2,4-diaminobenzensulfonate,
tributylammonium 2,4-diaminobenzensulfonate,
triamylammonium 2,4-diaminobenzensulfonate,
ammonium 2,4-diaminobenzene-1,5-disulfonate,
trimethylammonium 2,4-diaminobenzene-1,5-disulfonate,
triethylammonium 2,4-diaminobenzene-1,5-disulfonate,
tributylannonium 2,4-diaminobenzene-1,5-disulfonate,
triamylammonium 2,4-diaminobenzene-1,5-disulfonate,
ammonium 3,3'-dimethyl-4,4'-diaminobiphenyl-5-sulfonate,
trimethylammonium 3,3'-dimethyl-4,4'-diaminobiphenyl-5-sulfonate,
triethylammonium 3,3'-dimethyl-4,4'-diaminobiphenyl-5-sulfonate,
tributylammonium 3,3'-dimethyl-4,4'-diaminobiphenyl-5-sulfonate,
triamylammonium 3,3'-dimethyl-4,4'-diaminobiphenyl-5-sulfonate,
ammonium 3,3'-dimethyl-4,4'-diaminobiphenyl-6,6'-disulfonate,
trimethylammonium 3,3'-dimethyl-4,4'-diaminobiphenyl-6,6'-disulfonate,
triethylammonium 3,3'-dimethyl-4,4'-diaminobiphenyl-6,6'-disulfonate,
tributylammonium 3,3'-dimethyl-4,4'-diaminobiphenyl-6,6'-disulfonate,
triamylammonium 3,3'-dimethyl-4,4'-diaminobiphenyl-6,6'-disulfonate,
ammonium benzidine-2,2'-disulfonate, trimethylammonium benzidine-2,2'-disulfonate,
triethylammonium benzidine-2,2'-disulfonate,
tributylammonium benzidine-2,2'-disulfonate,
triamylammonium benzidine-2,2'-disulfonate,
ammonium 4,4'-diaminodiphenylether-2-sulfonate,
trimethylammonium 4,4'-diaminodiphenylether-2-sulfonate,
triethylammonium 4,4'-diaminodiphenylether-2-sulfonate,
tributylammonium 4,4'-diaminodiphenylether-2-sulfonate,
triamylammonium 4,4'-diaminodiphenylether-2-sulfonate,
ammonium 4,4'-diaminodiphenylether-3-sulfonate,
trimethylammonium 4,4'-diaminodiphenylether-3-sulfonate,
triethylammonium 4,4'-diaminodiphenylether-3-sulfonate,
tributylammonium 4,4'-diaminodiphenylether-3-sulfonate,
triamylammonium 4,4'-diaminodiphenylether-3-sulfonate,
ammonium 4,4'-diaminodiphenylether-2,2'-disulfonate,
trimethylammonium 4,4'-diaminodiphenylether-2,2'-disulfonate,
triethylammonium 4,4'-diaminodiphenylether-2,2'-disulfonate,
tributylammonium 4(4'-diaminodiphenylether-2,2'-disulfonate,
triamylammonium 4,4'-diaminodiphenylether-2,2'-disulfonate,
ammonium 4,4'-diaminodiphenylsulfone-3-sulfonate,
trimethylammonium 4,4'-diaminodiphenylsulfone-3-sulfonate,
triethylammonium 4,4'-diaminodiphenylsulfone-3-sulfonate,
tributylammonium 4,4'-diaminodiphenylsulfone-3-sulfonate,
triamylammonium 4,4'-diaminodiphenylsulfone-3-sulfonate,
ammonium 4,4'-diaminodiphenylsulfone-3,3'-disulfonate,
trimethylammonium 4,4'-diaminodiphenylsulfone-3,3'-disulfonate,
triethylammonium 4,4'-diaminodiphenylsulfone-3,3'-disulfonate,
tributylammonium 4,4'-diaminodiphenylsulfone-3,3'-disulfonate,
triamylammonium 4,4'-diaminodiphenylsulfone-3,3'-disulfonate,
ammonium 4,4'-diaminodiphenylmethane-2,2'-disulfonate,
trimethylammonium 4,4'-diaminodiphenylmethane-2,2'-disulfonate,
triethylammonium 4,4'-diaminodiphenylmethane-2,2'-disulfonate,
tributylammonium 4,4'-diaminodiphenylmethane-2,2'-disulfonate,
triamylammonium 4,4'-diaminodiphenylmethane-2,2'-disulfonate,
ammonium 4,4'-diaminodiphenylmethane-3,3'-disulfonate,
trimethylanmonium 4,4'-diaminodiphenylmethane-3,3'-disulfonate,
triethylammonium 4,4'-diaminodiphenylmethane-3,3'-disulfonate,
tributylammonium 4,4'-diaminodiphenylmethane-3,3'-disulfonate,
triamylammonium 4,4'-diaminodiphenylmethane-3,3'-disulfonate,
ammonium 4,4'-diaminodiphenylamine-2-sulfonate,
trimethylammonium 4,4'-diaminodiphenylamine-2-sulfonate,
triethylammonium 4,4'-diaminodiphenylamine-2-sulfonate,
tributylammonium 4,4'-diaminodiphenylamine-2-sulfonate,
triamylammonium 4,4'-diaminodiphenylamine-2-sulfonate,
ammonium 4,4'-diaminostilbene-2,2'-disulfonate,
trimethylammonium 4,4'-diaminostilbene-2,2'-disulfonate,
triethylammonium 4,4'-diaminostilbene-2,2'-disulfonate,
tributylammonium 4,4'-diaminostilbene-2,2'-disulfonate, and
triamylammonium 4,4'-diaminostilbene-2,2'-disulfonate.

The reaction between the diphenyltetracarboxylic acid or its derivative and the sulfonate group-containing aromatic amine of the formula (IV) or (V) for polymerization (polycondensation)-imidization is favorably performed in a phenolic solvent. The phenolic solvent preferably has a melting point of not higher than approximately 100° C., preferably not higher than 80° C., and a boiling point (at atmospheric pressure) of not higher than 300° C., preferably not higher than 280° C. Examples of the phenolic solvents include monohydric phenols such as phenol, o-cresol, m-cresol, p-cresol, 3,5-xylenol, carvacrol, and thymol; catechol; and halogenated monohydric phenol in which a hydrogen atom on the benzene ring is replaced with a halogen atom such as 3-chlorophenol, 4-chlorophenol, 3-bromophenol, 4-bromophenol, 2,4-dibromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-6-hydroxytoluene, and 4-bromo-2-hydroxytoluene. Most preferred halogenated phenol is 4-chlorophenol.

The reaction for polycondensation-imidization is generally performed in the phenolic solvent at 100° to 250° C., preferably at 130° to 200° C., under removing the produced water. The reaction period generally is 10 to 60 hours. The reaction can be performed by a batch system or by a continuous system.

The polycondensation reaction and imidization reaction can proceed simultaneously in series in one step to yield a polyimide solution in which the desired polyimide is dissolved in the phenolic solvent. The amount (i.e., concentration) of the polyimide in the phenolic solution preferably is in the range of 5 to 50 weight %. If the phenolic polyimide solution per se is employed for directly producing a semipermeable film such as a porous hollow fiber, it preferably has a polyimide concentration in the range of 10 to 40 wt. %, more preferably 12 to 25 wt. %, and a rotation viscosity at 100° C. (i.e., viscosity measured by a rotation viscometer at 100° C.) in the range of 10 to 8,000 poise, particularly 100 to 3,000 poise. An excessively high or low rotation viscosity may disturb the production of semipermeable film having a good quality.

The semipermeable film of the invention can be produced from the polyimide solution by known film-making methods such as dry method, wet method, and dry/wet method. The dry/wet method which comprises the steps of spreading the polyimide solution on a support or extruding the solution into an gaseous phase, introducing the spread or extruded polyimide solution into a coagulating liquid to give a coagulated polyimide, washing the coagulated polyimide to remove the coagulating liquid, and heating the yielded product to dryness is preferably employed for producing a semipermeable film showing good permeability and high selectivity.

The coagulating liquid preferably is a polar solvent which does not dissolve the polyimide and is compatible with a solvent for the polyimide. Examples of the coagulating liquids include water, alcohols such as methanol, ethanol, propanol and isopropanol, and ketones such as acetone, methyl ethyl ketone, diethyl ketone and ethyl propyl ketone. These solvents can be employed singly or in combination. A mixture of water and an alcohol such as ethanol is preferably employed for preparing an asymmetric semipermeable film (e.g., porous hollow fiber) having excellent permeability and high selectivity.

The coagulated film is washed with an alcoholic sol vent such as methanol, ethanol, propanol or isopropanol, and further washed with an inert solvent such as an aliphatic hydrocarbon (e.g., isopentane, n-hexane, isooctane, or n-heptane). Thus washed product is then dried and heat-treated to give the desired semipermeable film, preferably having the asymmetric structure. The heat treatment is preferably performed at a temperature lower than the softening temperature or second-order transition temperature of the polyimide employed. Generally, temperatures in the range of 90° to 400° C. are adopted.

The semipermeable film can be in the form of a flat film, a folded film, or a semipermeable hollow fiber. The semipermeable film preferably is in the form of a semipermeable hollow fiber, because the semipermeable hollow fiber give a large effective permeation surface. The semipermeable hollow fiber can be produced by known methods such as those described in Japanese Patent Publication 61-35282, Japanese Patent Publication H1-44804 (corresponding to U.S. Pat. No. 4,460,526), and Japanese Patent Publication H6-93988.

The conversion of the obtained aromatic polyimide having on its benzene ring the $SO_3N(L)_4$ group (i.e., ammonium sulfonate group) into the corresponding aromatic polyimide having the —$SO_3H$ or —$SO_3M$ (i.e., a sulfonic acid group or an alkali metal sulfonate group) is preferably performed when or after the polyimide is coagulated in the coagulating solvent to give a semipermeable film by incorporating an acid or an alkali metal alkoxide or an alkali metal hydroxide into the coagulating solvent. Otherwise, the conversion can be performed after the semipermeable film is formed, by bringing the semipermeable film into contact with a solvent containing an acid or an alkali metal alkoxide or an alkali metal hydroxide.

The conversion may be done locally or in part.

The acids employable for the conversion may be inorganic acids or organic acids. Examples of the acids include mineral acids such as hydrochloric acid, sulfuric acid, and nitric acid, and saturated aliphatic acids such as formic acid, acetic acid, propionic acid, butyric acid, valeric acid, and caproic acid. Other acids which can convert the ammonium sulfonate group into a sulfonic acid group may be also employed.

In the coagulating liquid, the acid is incorporated in an amount of 0.001 to 50 mol/L, particularly 0.01 to 10 mol/L, for efficiently convert the ammonium sulfonate group into the sulfonic acid group. The conversion is preferably performed at room temperature. Even when the acid is employed for converting the ammonium sulfonate group into the sulfonic acid group after the semipermeable film is formed, the acid is preferably employed in an aqueous acidic solution which may be mixed with an organic solvent such as alcohol or ketone. The period required for conversion may be 1 sec. to 100 hours, preferably 1 min. to 10 hours.

The alkoxide of alkali metal may be an alkoxide with 1 to 5 carbon atoms of an alkali metal such as lithium, sodium, potassium, or cesium. Examples of the hydroxides of alkali metal include lithium hydroxide sodium hydroxide, potassium hydroxide, and cesium hydroxide. The alkoxide or hydroxide of alkali metal can be employed for conversion of the ammonium sulfonate group into the alkali metal sulfonate group in the manner as described above for conversion of the ammonium sulfonate group into the sulfonate acid group.

A representative, but non-limitative, process for the production of a semipermeable hollow fiber is set forth below.

A polyimide dope solution having a rotation viscosity of 10 to 10,000 poise, particularly 100 to 6,000 poise which has been prepared in a phenolic solvent through polymerization-imidization is extruded into a gaseous phase through a nozzle for forming hollow fiber at an extruding temperature of 60° to 150° C., preferably 70° to 120° C., to give a product in the form of a hollow fiber. The product is then introduced into a coagulating solvent (preferably an alcoholic solvent or a mixture of water and an alcohol) maintained at −10° to +60° C., preferably −5° to +40° C., to give a coagulated product. The coagulated product is washed with an alcoholic solvent and an aliphatic hydrocarbon solvent, and then heated to dryness to give the desired asymmetric semipermeable hollow fiber.

Thus obtained asymmetric semipermeable hollow fiber has a high mechanical strength, high selectivity, and high gas permeability and is favorably employed for a gas separation film, for instance, for the separation between oxygen and nitrogen, separation between helium-nitrogen, separation of hydrogen from a gaseous mixture, or separation of carbon dioxide from a gaseous mixture.

The present invention is further described by the following examples.

EXAMPLE 1

Ninety-nine (99) mmol. of 3,3',4,4'-biphenyltetracarboxylic dianhydride (BPDA), 100 mmol. of triethylammonium 2,4-diaminobenzenesulfonate (m-DABS-Et$_3$N), and 195 g of 4-chlorophenol were placed in a separable flask equipped with a stirrer and a nitrogen gas-supplying tube. The mixture was heated to 160° C. under stirring for 45 hours to perform polymerization-imidization reaction to give a 4-chlorophenol solution containing 23 wt. % of an aromatic polyimide having a triethylammonium sulfonate group.

Thus obtained aromatic polyimide solution was passed through a stainless steal sieve of 400 mesh to give a dope solution.

The dope solution was introduced into a nozzle for preparation of hollow fiber (outer diameter of the round opening: 1,000 μm, width of slit at the opening: 200 μm, outer diameter of the core opening: 400 μm) of a spinning machine, and extruded from the opening of the nozzle into air. The extruded dope solution in the form of a hollow fiber was passed through atmosphere of dry nitrogen gas and introduced into a first coagulating liquid (ethanol) kept at 0°

C. and then guided into a vessel containing second coagulating liquid (ethanol) kept at 0° C. and equipped with a pair of guiding rolls. In the vessel, the dope solution in the form of a hollow fiber was moved forward and backward repeatedly to completely coagulate the hollow fiber of the dope solution. The coagulated dope solution in the form of a hollow fiber was drawn by a draw off roll at a draw rate of 15 m/min.

The drawn hollow fiber was wound around a bobbin and washed completely with ethanol. The ethanol on the fiber was then replaced with isooctane, which was in turn evaporated at 100° C. to dryness. The dried hollow fiber was then heated to 270° C. for 30 min. to give the desired hollow fiber of an aromatic polyimide having the triethylammonium sulfonate group and in the form of asymmetric structure.

The resulting aromatic polyimide hollow fiber had an outer diameter of 350 μm and a wall thickness of 60 μm.

EXAMPLE 2

The procedures of Example 1 were repeated except for replacing the ethanol of the first coagulating liquid with an aqueous ethanol (80 wt. %) to produce a hollow fiber of an aromatic polyimide having triethylammonium sulfonate group.

The resulting aromatic polyimide hollow fiber had an outer diameter of 345 μm and a wall thickness of 57 μm.

EXAMPLE 3

The procedures of Example 1 were repeated except for replacing the ethanol of the first coagulating liquid with an aqueous ethanol (75 wt. %) to produce a hollow fiber of an aromatic polyimide having triethylammonium sulfonate group.

The resulting aromatic polyimide hollow fiber had an outer diameter of 350 μm and a wall thickness of 57 μm.

EXAMPLE 4

The procedures of Example 1 were repeated except for replacing the ethanol of the first coagulating liquid with an aqueous ethanol (60 wt. %) to produce a hollow fiber of an aromatic polyimide having triethylammonium sulfonate group.

The resulting aromatic polyimide hollow fiber had an outer diameter of 355 μm and a wall thickness of 60 μm.

EXAMPLE 5

Ninety-nine (99) mmol. of 3,3',4,4'-biphenyltetracarboxylic dianhydride (BPDA), 100 mmol. of triethylammonium 3,3'-dimethyl-4,4'-diaminobiphenyl-5-sulfonate (OST-Et$_3$N), and 361 g of 4-chlorophenol were placed in a separable flask equipped with a stirrer and a nitrogen gas-supplying tube. The mixture was heated to 160° C. under stirring for 19 hours to perform polymerization-imidization reaction to give a 4-chlorophenol solution containing 16 wt. % of an aromatic polyimide having a triethylammonium sulfonate group.

Thus obtained aromatic polyimide solution was passed through a stainless steal sieve of 400 mesh to give a dope solution.

The procedures of Example 1 for producing a hollow fiber were repeated to produce a hollow fiber of an aromatic polyimide having triethylammonium sulfonate group.

The resulting aromatic polyimide hollow fiber had an outer diameter of 380 μm and a wall thickness of 80 μm.

[Evaluation of Permeability and Selectivity]

The permeability and selectivity of the semipermeable hollow fiber was evaluated in the following manner.

A gas separation module was produced by forming a bundle of the semipermeable hollow fiber using stainless steal pipes and epoxy resin adhesive and encasing the formed bundle of the porous hollow fiber into a stainless steal vessel. The effective surface area of the bundle of the porous hollow fiber was approximately 5 cm$^2$.

A gaseous mixture (He/O$_2$/N$_2$=30/30/40) was supplied into the vessel at 50° C. under the pressure difference (between the inside and outside of the hollow fiber) of 10 kg/cm$^2$ so as to pass the gaseous mixture into the inside of the hollow fiber through its wall. The gas collected from the inside of the hollow fiber as well as the gas having passed the wall were analyzed by gas chromatography to determine the gas permeation rate (P') in terms of Ncc/(cm$^2$·sec.·cmHg).

The results of evaluation are set forth in Table 1.

TABLE 1

| Example | Gas Permeation Rate (10$^{-5}$ Ncc/(cm$^2$ · sec · cmHg)) | | Selectivity (Rate of Separation) | |
|---|---|---|---|---|
| | P'He | P'O$_2$ | P'He/P'N$_2$ | P'O$_2$/P'N$_2$ |
| 1 | 5.3 | 0.29 | 69 | 3.7 |
| 2 | 3.8 | 0.16 | 134 | 5.8 |
| 3 | 5.8 | 0.21 | 147 | 5.7 |
| 4 | 7.4 | 0.26 | 134 | 4.7 |
| 5 | 3.3 | 0.33 | 33 | 3.3 |

EXAMPLE 6

The procedures of Example 1 were repeated to produce a coagulated dope solution in the form of a hollow fiber which was then drawn by a draw off roll at a draw rate of 15 m/min.

The drawn hollow fiber was wound around a bobbin and washed completely with ethanol. Thus washed hollow fiber was immersed in an aqueous hydrochloric acid (6 mol/L) at room temperature for 2 hours so as to convert the triethylammonium sulfonate group into a sulfonic acid group. Thus treated hollow fiber was washed with ethanol completely. The ethanol on the fiber was then replaced with isooctane, which was in turn evaporated at 100° C. to dryness. The dried hollow fiber was then heated to 270° C. for 30 min. to give the desired hollow fiber of an aromatic polyimide having a sulfonic acid group and in the form of asymmetric structure.

The resulting aromatic polyimide hollow fiber had an outer diameter of 350 μm and a wall thickness of 60 μm.

EXAMPLE 7

The procedures of Example 6 were repeated except for replacing the ethanol of the first coagulating liquid with an aqueous ethanol (75 wt. %) to produce a hollow fiber of an aromatic polyimide having a sulfonic acid group.

The resulting aromatic polyimide hollow fiber had an outer diameter of 350 μm and a wall thickness of 57 μm.

EXAMPLE 8

The procedures of Example 6 were repeated except for replacing the ethanol of the first coagulating liquid with an aqueous ethanol (60 wt. %) to produce a hollow fiber of an aromatic polyimide having a sulfonic acid group.

The resulting aromatic polyimide hollow fiber had an outer diameter of 345 μm and a wall thickness of 60 μm.

EXAMPLE 9

The procedures of Example 6 were repeated except for replacing the aqueous hydrochloric acid (for acid treatment) with an ethanol solution containing 20 wt. % of hydrochloric acid to produce a hollow fiber of an aromatic polyimide having a sulfonic acid group.

The resulting aromatic polyimide hollow fiber had an outer diameter of 352 μm and a wall thickness of 61 μm.

EXAMPLE 10

Ninety-nine (99) mmol. of 3,3',4,4'-biphenyltetracarboxylic dianhydride (BPDA), 100 mmol. of triethylammonium 3,3'-dimethyl-4,4'-diaminobiphenyl-5-sulfonate (OST-Et$_3$N), and 341 g of 4-chlorophenol were placed in a separable flask equipped with a stirrer and a nitrogen gas-supplying tube. The mixture was heated to 160° C. under stirring for 19 hours to perform polymerization-imidization reaction to give a 4-chlorophenol solution containing 16 wt. % of an aromatic polyimide having a triethylammonium sulfonate group.

Thus obtained aromatic polyimide solution was passed through a stainless steal sieve of 400 mesh to give a dope solution.

The procedures of Example 6 for producing a hollow fiber were repeated except for changing the period of acid treatment from 2 hours to 30 minutes to produce a hollow fiber of an aromatic polyimide having a sulfonic acid group.

The resulting aromatic polyimide hollow fiber had an outer diameter of 350 μm and a wall thickness of 60 μm.

EXAMPLE 11

The procedures of Example 10 were repeated except for changing the period of acid treatment from 30 minutes to 2 hours to produce a hollow fiber of an aromatic polyimide having a sulfonic acid group.

The resulting aromatic polyimide hollow fiber had an outer diameter of 361 μm and a wall thickness of 65 μm.

[Evaluation of Permeability and Selectivity]

The permeability and selectivity of the porous hollow fiber was evaluated in the aforementioned manner.

The results of evaluation are set forth in Table 2.

TABLE 2

| Example | Gas Permeation Rate ($10^{-5}$ Ncc/(cm$^2$ · sec · cmHg)) | | Selectivity (Rate of Separation) | |
|---|---|---|---|---|
| | P'He | P'O$_2$ | P'He/P'N$_2$ | P'O$_2$/P'N$_2$ |
| 6 | 4.0 | 0.19 | 37 | 1.7 |
| 7 | 7.5 | 0.21 | 111 | 3.1 |
| 8 | 6.3 | 0.20 | 70 | 2.2 |
| 9 | 4.3 | 0.22 | 40 | 2.0 |
| 10 | 4.5 | 0.38 | 36 | 3.0 |
| 11 | 5.7 | 0.43 | 40 | 3.0 |

EXAMPLE 12

The procedures of Example 2 were repeated to produce a coagulated dope solution in the form of a hollow fiber which was then drawn by a draw off roll at a draw rate of 15 m/min.

The drawn hollow fiber was wound around a bobbin and washed completely with ethanol. Thus washed hollow fiber was immersed in an ethanolic solution containing sodium methoxide (1 mol/L) at room temperature for 3 seconds so as to convert the triethylammonium sulfonate group into a sodium sulfonate group. Thus treated hollow fiber was washed with ethanol completely. The ethanol on the fiber was then replaced with isooctane, which was in turn evaporated at 100° C. to dryness. The dried hollow fiber was then heated to 270° C. for 30 min. to give the desired hollow fiber of an aromatic polyimide having a sodium sulfonate group and in the form of asymmetric structure.

The resulting aromatic polyimide hollow fiber had an outer diameter of 350 μm and a wall thickness of 60 μm.

EXAMPLE 13

The procedures of Example 12 were repeated except for prolonging the period of immersion of the hollow fiber in the sodium methoxide-containing ethanol solution from 3 seconds to 10 seconds, to produce a hollow fiber of an aromatic polyimide having a sodium sulfonate group.

The resulting aromatic polyimide hollow fiber had an outer diameter of 350 μm and a wall thickness of 57 μm.

EXAMPLE 14

The procedures of Example 12 were repeated except for prolonging the period of immersion of the hollow fiber in the sodium methoxide-containing ethanol solution from 3 seconds to 30 seconds, to produce a hollow fiber of an aromatic polyimide having a sodium sulfonate group.

The resulting aromatic polyimide hollow fiber had an outer diameter of 345 μm and a wall thickness of 60 μm.

EXAMPLE 15

The procedures of Example 12 were repeated except for replacing the sodium methoxide-containing ethanol with an aqueous sodium hydroxide solution (0.05 mol/L) and prolonging the period of immersion of the hollow fiber in the aqueous sodium hydroxide solution from 3 seconds to 30 seconds, to produce a hollow fiber of an aromatic polyimide having a sodium sulfonate group.

The resulting aromatic polyimide follow fiber had an outer diameter of 349 μm and a wall thickness of 62 μm.

EXAMPLE 16

The procedures of Example 12 were repeated except for replacing the sodium methoxide-containing ethanol with an aqueous sodium hydroxide solution (0.05 mol/L) and prolonging the period of immersion of the hollow fiber in the aqueous sodium hydroxide solution from 3 seconds to one minute, to produce a hollow fiber of an aromatic polyimide having a sodium sulfonate group.

The resulting aromatic polyimide hollow fiber had an outer diameter of 353 μm and a wall thickness of 60 μm.

EXAMPLE 17

The procedures of Example 12 were repeated except for replacing the sodium methoxide-containing ethanol with an aqueous sodium hydroxide solution (0.05 mol/L) and prolonging the period of immersion of the hollow fiber in the aqueous sodium hydroxide solution from 3 seconds to 3 minutes, to produce a hollow fiber of an aromatic polyimide having a sodium sulfonate group.

The resulting aromatic polyimide hollow fiber had an outer diameter of 350 μm and a wall thickness of 62 μm.

EXAMPLE 18

The procedures of Example 12 were repeated except for replacing the aqueous ethanol (80wt. %) of the first coagulating liquid with a 60 wt. % aqueous ethanol and prolonging the period of immersion of the hollow fiber in the sodium methoxide-containing ethanol solution from 3 seconds to 30 seconds, to produce a hollow fiber of an aromatic polyimide having a sodium sulfonate group.

The resulting aromatic polyimide hollow fiber had an outer diameter of 349 μm and a wall thickness of 61 μm.

EXAMPLE 19

Ninety-nine (99) mmol. of 3,3',4,4'-biphenyltetracarboxylic dianhydride (BPDA), 100 mmol. of triethylammonium 3,3'-dimethyl-4,4'-diaminobiphenyl-5-sulfonate (OST-Et3N), and 341 g of 4-chlorophenol were placed in a separable flask equipped with a stirrer and a nitrogen gas-supplying tube. The mixture was heated to 160° C. under stirring for 45 hours to perform polymerization-imidization reaction to give a 4-chlorophenol solution containing 16 wt. % of an aromatic polyimide having a triethylammonium sulfonate group.

Thus obtained aromatic polyimide solution was passed through a stainless steal sieve of 400 mesh to give a dope solution.

The procedures of Example 12 for producing a hollow fiber were repeated except for changing the period of treatment with the sodium methoxide-containing ethanolic solution from 3 seconds to 10 seconds to produce a hollow fiber of an aromatic polyimide having a sodium sulfonate group.

The resulting aromatic polyimide hollow fiber had an outer diameter of 358 μm and a wall thickness of 65 μm.

EXAMPLE 20

The procedures of Example 19 were repeated except for prolonging the period of immersion of the hollow fiber in the sodium methoxide-containing ethanol solution from 10 seconds to 30 seconds, to produce a hollow fiber of an aromatic polyimide having a sodium sulfonate group.

The resulting aromatic polyimide hollow fiber had an outer diameter of 362 μm and a wall thickness of 65 μm.

EXAMPLE 21

The procedures of Example 19 were repeated except for prolonging the period of immersion of the hollow fiber in the sodium methoxide-containing ethanol solution from 10 seconds to one minute, to produce a hollow fiber of an aromatic polyimide having a sodium sulfonate group.

The resulting aromatic polyimide follow fiber had an outer diameter of 360 μm and a wall thickness of 61 μm.

[Evaluation of Permeability and Selectivity]

The permeability and selectivity of the semipermeable hollow fiber was evaluated in the aforementioned manner.

The results of evaluation are set forth in Table 3.

TABLE 3

| Example | Gas Permeation Rate ($10^{-5}$ Ncc/(cm$^2$ · sec · cmHg)) | | Selectivity (Rate of Separation) | |
|---|---|---|---|---|
| | P'He | P'O$_2$ | P'He/P'N$_2$ | P'O$_2$/P'N$_2$ |
| 12 | 2.0 | 0.06 | 109 | 3.4 |
| 13 | 1.5 | 0.05 | 157 | 5.3 |
| 14 | 1.6 | 0.05 | 144 | 4.6 |
| 15 | 7.9 | 0.29 | 111 | 4.1 |
| 16 | 7.6 | 0.27 | 156 | 5.6 |
| 17 | 7.7 | 0.22 | 168 | 4.9 |
| 18 | 8.0 | 0.23 | 68 | 2.0 |
| 19 | 4.8 | 0.39 | 32 | 2.6 |
| 20 | 5.7 | 0.46 | 26 | 2.1 |
| 21 | 5.4 | 0.43 | 28 | 2.2 |

COMPARISON EXAMPLE 1

Ninety-nine (99) mmol. of 3,3',4,4'-biphenyltetracarboxylic dianhydride (BPDA), 100 mmol. of 2,4-diaminobenzenesulfonic acid (mDABS), and 217 g of 4-chlorophenol were placed in a separable flask equipped with a stirrer and a nitrogen gas-supplying tube. The mixture was heated to 160° C. under stirring for 5 hours to perform polymerization-imidization reaction. In the course of the reaction, a polymer precipitated, and therefore no homogeneous aromatic polyimide solution was obtained.

COMPARISON EXAMPLE 2

Ninety-nine (99) mmol. of 3,3',4,4'-biphenyltetracarboxylic dianhydride (BPDA), 100 mmol. of sodium 2,4-diaminobenzenesulfonate (mDABS-Na), and 227 g of 4-chlorophenol were placed in a separable flask equipped with a stirrer and a nitrogen gas-supplying tube. The mixture was heated to 160° C. under stirring for 4 hours to perform polymerization-imidization reaction. In the course of the reaction, a polymer precipitated, and therefore no homogeneous aromatic polyimide solution was obtained.

COMPARISON EXAMPLE 3

The polymerization-imidization reaction of Comparison example 2 was repeated except for prolonging the reaction period from 4 hours to 35 hours and replacing the chlorophenol with the same amount of N-methylpyrrolidone. In the course of the reaction, a polymer precipitated, and finally the reaction mixture turned into a gel. Therefore, the obtained reaction mixture could not be used for the preparation of a hollow fiber.

COMPARISON EXAMPLE 4

Ninety-nine (99) mmol. of pyromellitic dianhydride (PMDA), 100 mmol. of triethylammonium 2,4-diaminobenzenesulfonate (mDABS-Et$_3$N), and 227 g of 4-chlorophenol were placed in a separable flask equipped with a stirrer and a nitrogen gas-supplying tube. The mixture was heated to 160° C. under stirring for 10 hours to perform polymerization-imidization reaction. The reaction mixture was turbid, and no homogeneous aromatic polyimide solution was obtained.

COMPARISON EXAMPLE 5

Ninety-nine (99) mmol. of 3,3',4,4'-biphenyltetracarboxylic dianhydride (BPDA), 100 mmol. of triethylammonium 2,4-diaminobenzenesulfonate (mDABS-Et$_3$N), and 218 g of N-methylpyrrolidone were placed in a separable flask equipped with a stirrer and a nitrogen gas-supplying tube. The mixture was heated to 160° C. under stirring for 40 hours to perform polymerization-imidization reaction. In the course of the reaction, a polymer precipitated, and finally the reaction mixture turned into a gel. Therefore, the obtained reaction mixture could not be used for the preparation of a hollow fiber.

What is claimed is:

1. An aromatic polyimide consisting essentially of a recurring structural unit of the formula (I):

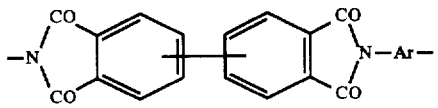

wherein Ar is a divalent aromatic group having the formula (II):

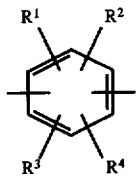

in which at least one of $R^1$ through $R^4$ is a sulfonate group selected from the group consisting of —$SO_3H$, —$SO_3M$, and —$SO_3N(L)_4$, wherein M is an alkali metal and L is a hydrogen atom or an alkyl group having 1 to 5 carbon atoms, and others of $R^1$ through $R^4$ are independently hydrogen atoms or alkyl groups having 1 to 3 carbon atoms;

or the formula (III):

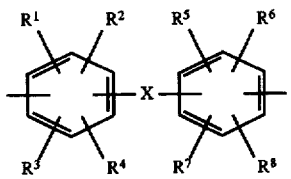

in which at least one of $R^1$ through $R^8$ is a sulfonate group selected from the group consisting of —$SO_3H$, —$SO_3M$, and —$SO_3N(L)_4$, wherein M is an alkali metal and L is a hydrogen atom or an alkyl group having 1 to 5 carbon atoms, and others of $R^1$ through $R^8$ are independently hydrogen atoms or alkyl groups having 1 to 3 carbon atoms, and X is a single bond, —O—, —$SO_2$—, —NH—, an alkylene group having 1 to 3 carbon atoms, or an alkenylene group having 1 to 3 carbon atoms.

2. The aromatic polyimide of claim 1, wherein Ar has the formula (II) having the sulfonate group represented by —$SO_3N(L)_4$ in which each of L is a hydrogen atom or an alkyl group having 1 to 5 carbon atoms.

3. The aromatic polyimide of claim 1, wherein Ar has the formula (II) having the sulfonate group represented by —$SO_3H$.

4. The aromatic polyimide of claim 1, wherein Ar has the formula (II) having the sulfonate group represented by —$SO_3M$ in which M is Li, Na or K.

5. The aromatic polyimide of claim 1, wherein Ar has the formula (III) having the sulfonate group represented by —$SO_3N(L)_4$ in which each of L is a hydrogen atom or an alkyl group having 1 to 5 carbon atoms, and X is a single bond.

6. The aromatic polyimide of claim 1, wherein Ar has the formula (III) having the sulfonate group represented by —$SO_3H$, and X is a single bond.

7. The aromatic polyimide of claim 1, wherein Ar has the formula (III) having the sulfonate group represented by —$SO_3M$ in which M is Li, Na or K, and X is a single bond.

8. A semipermeable film of an aromatic polyimide consisting essentially of a recurring structural unit of the formula (I):

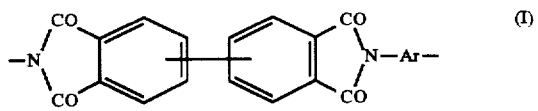

wherein Ar is a divalent aromatic group having the formula (II):

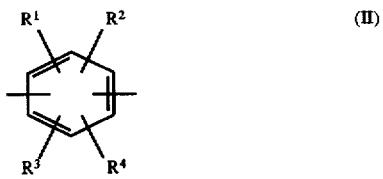

in which at least one of $R^1$ through $R^4$ is a sulfonate group selected from the group consisting of —$SO_3H$, —$SO_3M$, and —$SO_3N(L)_4$, wherein M is an alkali metal and L is a hydrogen atom or an alkyl group having 1 to 5 carbon atoms, and others of $R^1$ through $R^4$ are independently hydrogen atoms or alkyl groups having 1 to 3 carbon atoms;

or the formula (III):

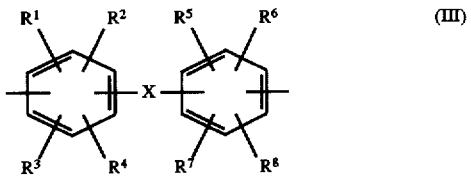

in which at least one of $R^1$ through $R^8$ is a sulfonate group selected from the group consisting of —$SO_3H$, —$SO_3M$, and —$SO_3N(L)_4$, wherein M is an alkali metal and L is a hydrogen atom or an alkyl group having 1 to 5 carbon atoms, and others of $R^1$ through $R^8$ are independently hydrogen atoms or alkyl groups having 1 to 3 carbon atoms, and X is a single bond, —O—, —$SO_2$—, —NH—, an alkylene group having 1 to 3 carbon atoms, or an alkenylene group having 1 to 3 carbon atoms.

9. The semipermeable film of claim 8, which is in the form of a hollow fiber.

10. The semipermeable film of claim 8, wherein Ar of the formula (I) has the formula (II) having the sulfonate group represented by —$SO_3N(L)_4$ in which each of L is a hydrogen atom or an alkyl group having 1 to 5 carbon atoms.

11. The semipermeable film of claim 8, wherein Ar of the formula (I) has the formula (II) having the sulfonate group represented by —$SO_3H$.

12. The semipermeable film of claim 8, wherein Ar of the formula (I) has the formula (II) having the sulfonate group represented by —$SO_3M$ in which M is Li, Na or K.

13. The semipermeable film of claim 8, wherein Ar of the formula (I) has the formula (III) having the sulfonate group represented by —$SO_3N(L)_4$ in which each of L is a hydrogen atom or an alkyl group having 1 to 5 carbon atoms, and X is a single bond.

14. The semipermeable film of claim 8, wherein Ar of the formula (I) has the formula (III) having the sulfonate group represented by —$SO_3H$, and X is a single bond.

15. The semipermeable film of claim 8, wherein Ar of the formula (I) has the formula (III) having the sulfonate group represented by —$SO_3M$ in which M is Li, Na or K, and X is a single bond.

16. A process for selectively permeating at least one gaseous component from a mixture of gaseous components through the semipermeable film of an aromatic polyimide of claim 8.

17. A process for preparing an aromatic polyimide consisting essentially of a recurring structural unit of the formula (I):

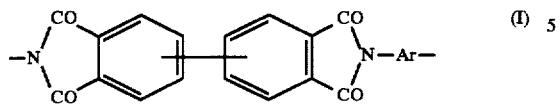

wherein Ar is a divalent aromatic group having the formula (II):

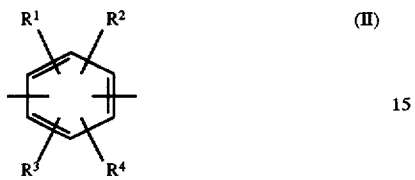

in which at least one of $R^1$ through $R^4$ is a sulfonate group selected from the group consisting of —$SO_3H$ and —$SO_3M$, wherein M is an alkali metal, and others of $R^1$ through $R^4$ are independently hydrogen atoms or alkyl groups having 1 to 3 carbon atoms;
or the formula (III):

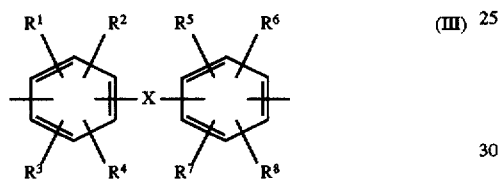

in which at least one of $R^1$ through $R^8$ is a sulfonate group selected from the group consisting of —$SO_3H$ and —$SO_3M$, wherein M is an alkali metal, and others of $R^1$ through $R^8$ are independently hydrogen atoms or alkyl groups having 1 to 3 carbon atoms, and X is a single bond, —O—, —$SO_2$—, —NH—, an alkylene group having 1 to 3 carbon atoms, or an alkenylene group having 1 to 3 carbon atoms,
which comprises the steps of:
reacting a biphenyltetracarboxylic acid or its derivative with an aromatic diamine compound having the formula (IV) or (V):

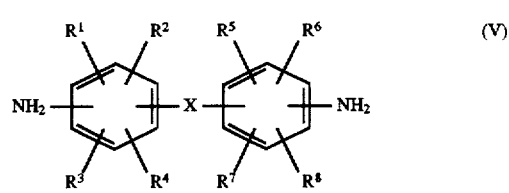

in which at least one of $R^1$ to $R^4$ and at least one of $R^1$ to $R^8$ is a sulfonate group of —$SO_3N(L)_4$, others of $R^1$ to $R^8$ are hydrogen atoms or alkyl groups having 1 to 3 carbon atoms, and X has the same meaning as above, in essentially equimolar amounts in a phenolic solvent to give an aromatic polyimide having a recurring structural unit of the formula (I):

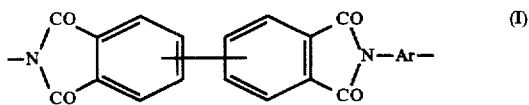

wherein Ar has the same meaning as above, except that at least one of $R^1$ through $R^4$ is a sulfonate group of —$SO_3N(L)_4$ wherein L is a hydrogen atom or an alkyl group having 1 to 5 carbon atoms; and bringing the resulting aromatic polyimide into contact with an acid or an alkoxide or hydroxide of alkali metal.

* * * * *